(12) United States Patent
Frank et al.

(10) Patent No.: US 10,546,514 B2
(45) Date of Patent: Jan. 28, 2020

(54) MOBILE DEMONSTRATION DEVICE FOR SOUND-REDUCING TILES

(71) Applicant: USG INTERIORS LLC, Chicago, IL (US)

(72) Inventors: William Frank, Lake Villa, IL (US); James Mark Kemerling, Aurora, IL (US); Chester Chatman, Waukegan, IL (US)

(73) Assignee: USG INTERIORS, LLC, Chicago, IL (US)

( * ) Notice: Subject to any disclaimer, the term of this patent is extended or adjusted under 35 U.S.C. 154(b) by 772 days.

(21) Appl. No.: 15/054,482

(22) Filed: Feb. 26, 2016

(65) Prior Publication Data

US 2017/0249864 A1    Aug. 31, 2017

(51) Int. Cl.
  *G09B 25/00*   (2006.01)
  *G09B 23/14*   (2006.01)
  *G09B 5/00*    (2006.01)

(52) U.S. Cl.
  CPC .............. *G09B 23/14* (2013.01); *G09B 5/00* (2013.01)

(58) Field of Classification Search
  USPC ......... 434/48, 300, 365, 367, 372, 373, 379; 73/579, 583, 589; 181/284–286, 290, 294
  See application file for complete search history.

(56) References Cited

U.S. PATENT DOCUMENTS

| | | |
|---|---|---|
| 1,766,103 A | 6/1930 | Burgess |
| 2,022,402 A | 11/1935 | Canfield |
| 3,254,739 A | 6/1966 | Hardy |
| 3,922,506 A | 11/1975 | Frye |
| 4,194,307 A | 3/1980 | Payne |

(Continued)

FOREIGN PATENT DOCUMENTS

GB    2404779 A    2/2005

OTHER PUBLICATIONS

International Preliminary Report on Patentability and Written Opinion of the International Searching Authority for International Application No. PCT/US2017/018684, dated Aug. 28, 2018.
International Search Report and Written Opinion for International Application No. PCT/US2017/018684, dated Aug. 23, 2017.

(Continued)

*Primary Examiner* — Kurt Fernstrom
(74) *Attorney, Agent, or Firm* — Marshall, Gerstein & Borun LLP

(57) ABSTRACT

An assembly for demonstrating sound transmission properties includes a base portion and a tray portion partially defining a transmission aperture is removably inserted into a portion of the base portion. A first sound-reducing tile having a first sound transmission property is placed in the tray portion and a sound generating device disposed in an interior volume of the base portion emits sound that is attenuated by the first sound-reducing tile as the sound exits the transmission aperture. A second sound-reducing tile having a second sound transmission property is placed in the tray portion and the sound generating device disposed in the interior volume of the base portion emits sound that is attenuated by the second sound-reducing tile as the sound exits the transmission aperture. A sound measuring device disposed outside the interior volume device can compare the first and second sound transmission properties.

5 Claims, 4 Drawing Sheets

(56) References Cited

U.S. PATENT DOCUMENTS

| | | | | |
|---|---|---|---|---|
| 4,644,794 | A * | 2/1987 | Vaicaitis | G01H 3/00 73/583 |
| 5,554,830 | A * | 9/1996 | Muller | B32B 7/02 181/290 |
| 7,710,124 | B2 | 5/2010 | Ariav et al. | |
| 7,731,085 | B2 | 6/2010 | Gillespie et al. | |
| 8,066,097 | B2 * | 11/2011 | Boyadjian | E04F 13/08 181/285 |
| 8,678,133 | B2 * | 3/2014 | Clausi | B32B 25/14 181/294 |
| 8,707,788 | B2 | 4/2014 | Lee | |
| 2005/0050846 | A1 * | 3/2005 | Surace | B32B 7/12 52/782.1 |
| 2005/0281997 | A1 * | 12/2005 | Grah | B32B 7/02 428/215 |
| 2010/0170746 | A1 * | 7/2010 | Restuccia | B29C 70/083 181/290 |
| 2010/0230206 | A1 * | 9/2010 | Tinianov | B32B 3/00 181/286 |
| 2014/0302294 | A1 * | 10/2014 | Freedman | E04F 15/206 428/213 |
| 2016/0208482 | A1 * | 7/2016 | Ddamulira | E04C 2/284 |

OTHER PUBLICATIONS

Passionate About Sound—Bell Box (video embedded on <http://www.armstrong.com/commceilingsna/totalacoustics.html?channelId&channelListId&mediaId=8c44d5640f1d4dccb28b03d80690a98c>), which was publicly available before Feb. 26, 2016.

* cited by examiner

FIG. 2A
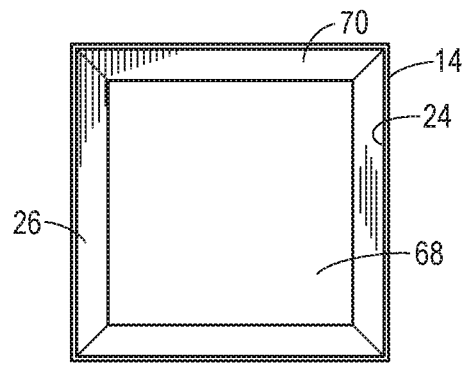
FIG. 3A
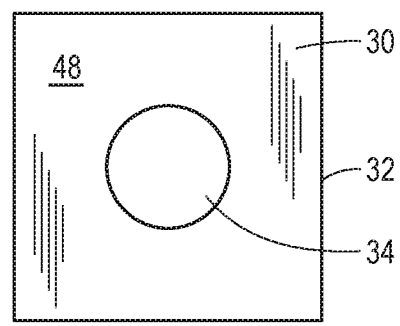
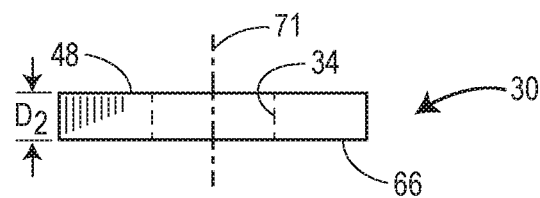
FIG. 3B
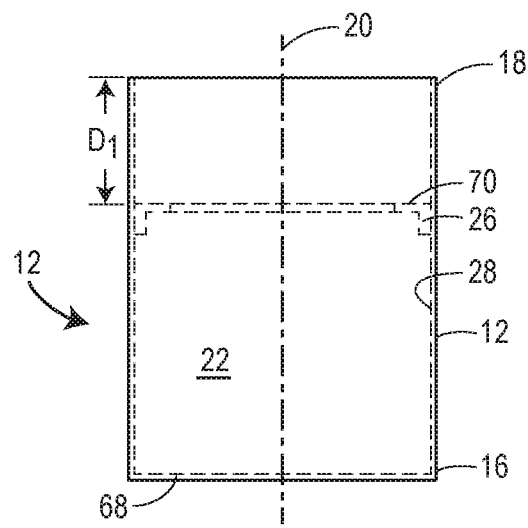
FIG. 2B
FIG. 4A
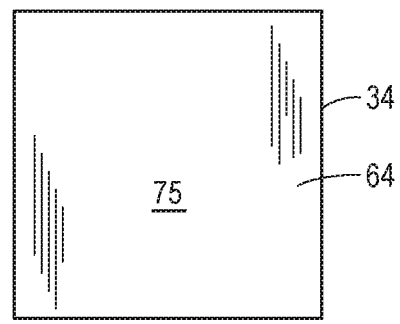
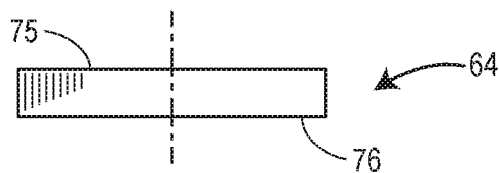
FIG. 4B

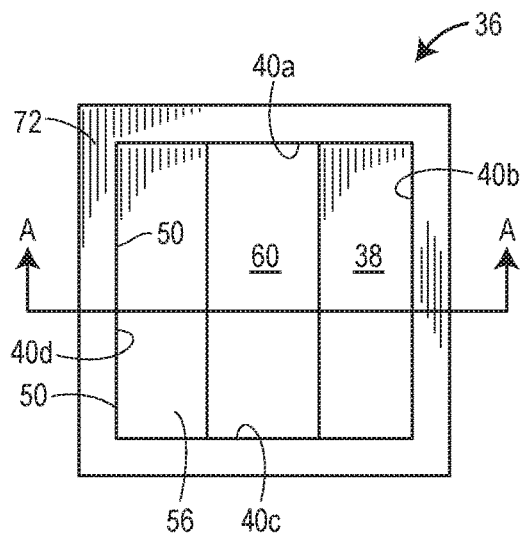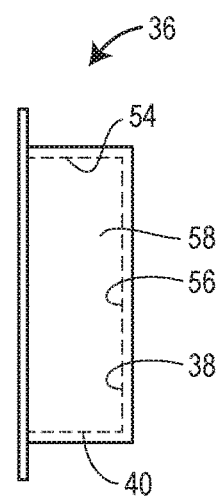
*FIG. 5A*  *FIG. 5B*
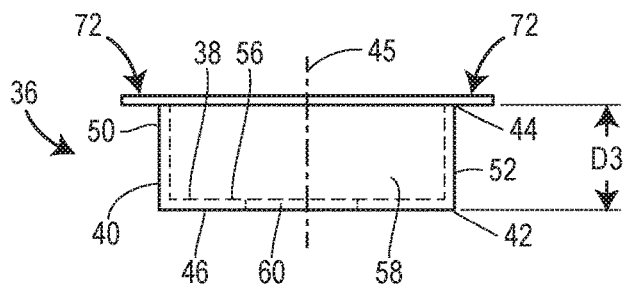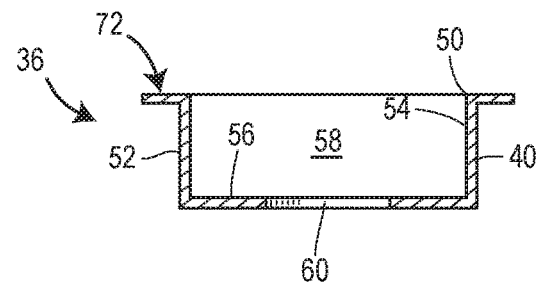
*FIG. 5C*  *FIG. 5D*
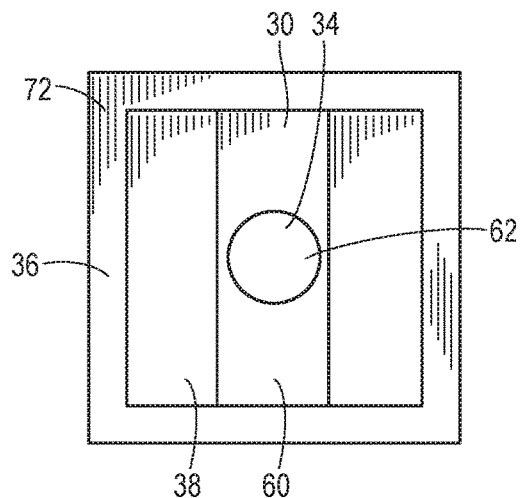
*FIG. 6*

MOBILE DEMONSTRATION DEVICE FOR SOUND-REDUCING TILES

FIELD OF THE DISCLOSURE

This disclosure relates generally to demonstration devices, and, more particularly, to demonstration devices used with sound-reducing tile samples.

BACKGROUND

Sound-reducing tiles are commonly used in application that requires that sound transmission be reduced. For example, ceiling tiles used in offices or residential units may be sound-reducing tiles to reduce the amount of noise generated from a first level that is transmitted to adjacent levels. Such sound-reducing tiles may be rated or categorized using decibel ("dB") measurements or Ceiling Attenuation Class ("CAC") value, these measurement and CAC values are not intuitively understood by potential customers purchasing sound-reducing tiles. Accordingly, there is a need for a reliable and portable device that allows a user—such as a salesperson—to demonstrate the effectiveness of a first sound-reducing tile over a second sound-reducing tile.

BRIEF SUMMARY OF THE DISCLOSURE

An assembly for demonstrating sound transmission properties includes a base portion including at least one side wall, the base portion extending from a first end to a second end along an assembly axis, the at least one side wall at least partially defining an interior volume. The at least one side wall defines a base perimeter when viewed along the assembly axis. The assembly further includes at least one support member secured to an inner surface of the at least one side wall, and the at least one support member is disposed between the first end and the second end of the base portion. A top member is at least partially supported by the at least one support member, the top member being removably disposed within the interior volume. A perimeter edge of the top member corresponds in shape to the base perimeter, and at least one top member aperture extends through the top member. The assembly also includes a tray portion having a bottom wall and at least one tray side wall that upwardly extends from the bottom wall. The at least one tray side wall extends from a first end to a second end along the assembly axis, and the bottom wall is disposed at or adjacent to the first end of the at least one tray side wall. The at least one tray side wall defines a tray perimeter when viewed along the assembly axis, and the tray perimeter corresponds in shape to the base perimeter. An inner surface of the at least one tray side wall and a top surface of the bottom wall cooperate to define a tray volume, wherein a cutout portion extends through a portion of the bottom wall of the tray portion. At least a portion of the cutout portion overlaps at least a portion of the top member aperture to form a transmission aperture. In some embodiments, the cutout portion is larger than the top member aperture and does not obstruct the top member aperture, and the top member aperture defines the transmission aperture. The assembly further includes a first sound-reducing tile disposed within the tray volume such that a portion of the first sound-reducing tile completely covers or obstructs the transmission aperture, and the first sound-reducing tile has a first sound transmission property.

BRIEF DESCRIPTION OF THE DRAWINGS

FIG. 2A is a top view of an embodiment of a base portion;

FIG. 2B is a side view of the embodiment of the base portion of FIG. 2A;

FIG. 3A is a top view of an embodiment of a top member;

FIG. 3B is a side view of the embodiment of the top member of FIG. 3A;

FIG. 4A is a top view of an embodiment of a first sound-reducing tile;

FIG. 4B is a side view of the embodiment of the first sound-reducing tile of FIG. 4A;

FIG. 5A is a top view of an embodiment of a tray portion;

FIG. 5B is a front view of the embodiment of the tray portion of FIG. 5A;

FIG. 5C is a side view of the embodiment of the tray portion of FIG. 5A;

FIG. 5D is a cross-sectional view of the embodiment of the tray portion of FIG. 5A taken along line A-A of FIG. 5A;

FIG. 6 is a top view of the embodiment of assembly of FIG. 1; and

DETAILED DESCRIPTION

Figure 1:
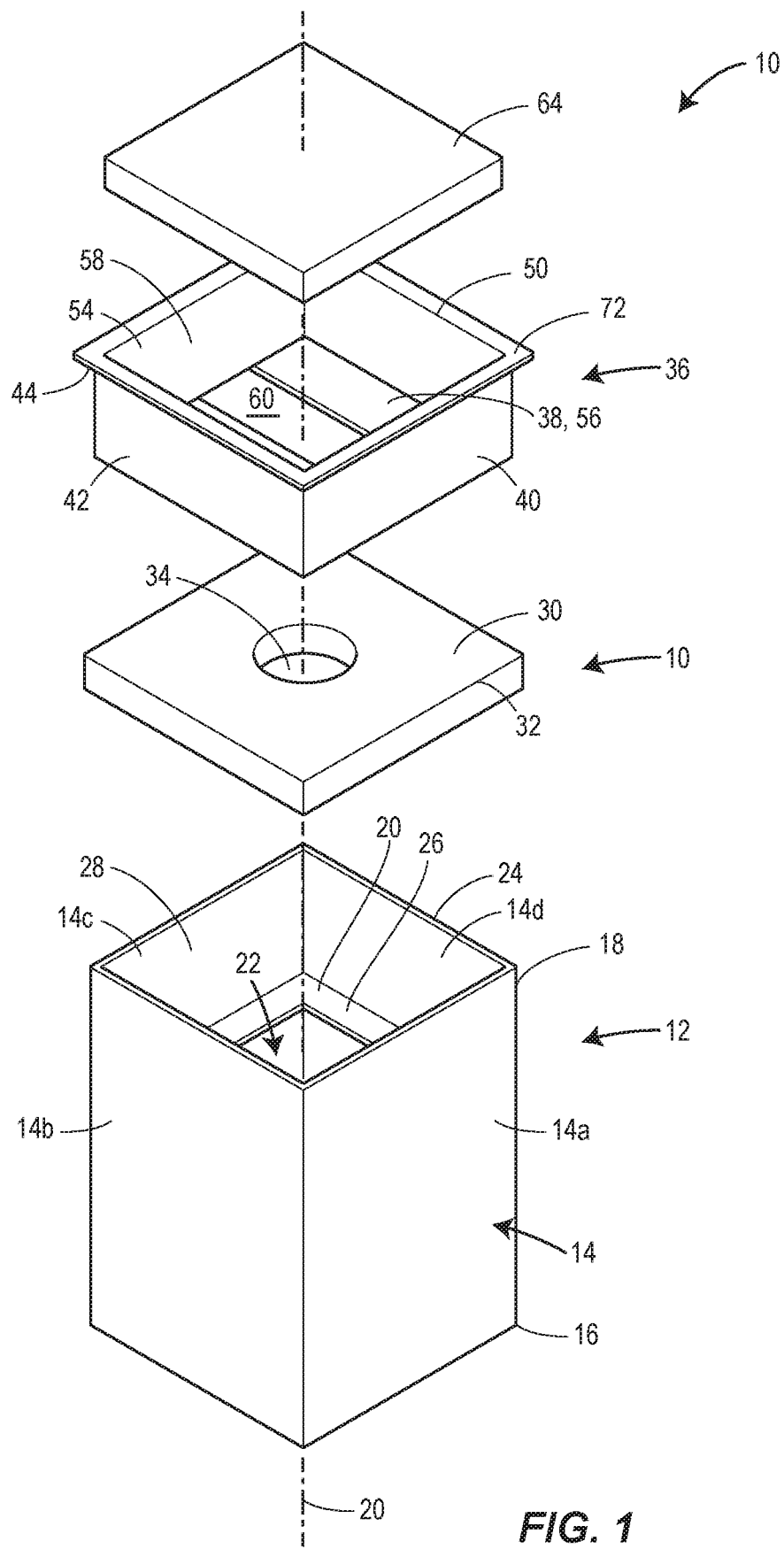
FIG. 1 is an exploded view of an embodiment of an assembly for demonstrating sound transmission properties.
Figure 7:
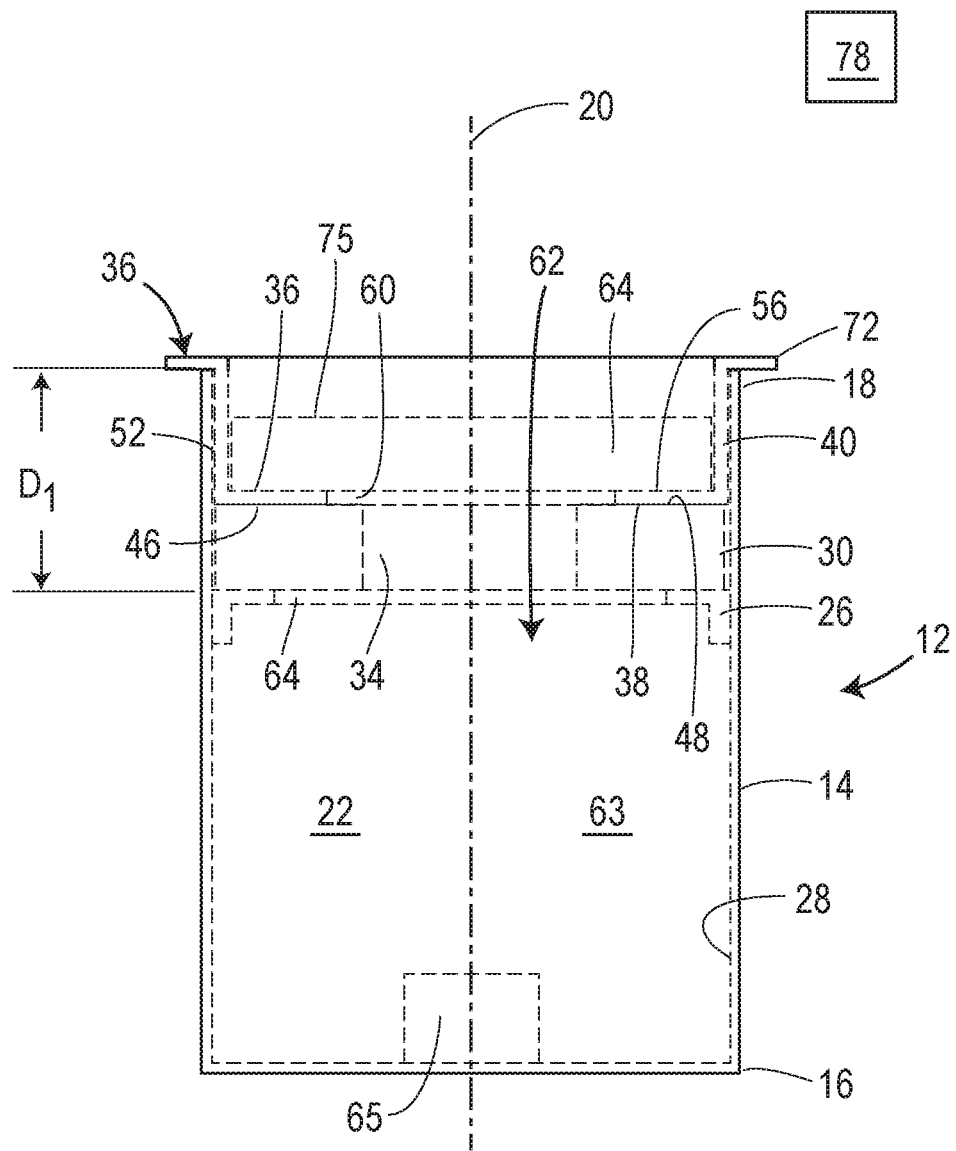
FIG. 7 is a side view of the embodiment of assembly of FIG. 1.

As illustrated in FIG. 1 below, an assembly 10 for demonstrating sound transmission properties is intended to be brought to trade shows and customer visits to demonstrate the superiority of the client's sound-reducing tiles relative to competitor's tiles. The assembly 10 includes a base portion 12 including at least one side wall 14, the base portion extending from a first end 16 to a second end 18 along an assembly axis 20, the at least one side wall at least partially defining an interior volume 22. The at least one side wall 14 defines a base perimeter 24 when viewed along the assembly axis 20. The assembly 10 further includes at least one support member 26 secured to an inner surface 28 of the at least one side wall 14, and the at least one support member 26 is disposed between the first end 16 and the second end 18 of the base portion 12. A top member 30 is at least partially supported by the at least one support member 26, the top member 30 being removably disposed within the interior volume 22, as illustrated in FIG. 7. Referring again to FIG. 1, a perimeter edge 32 of the top member 30 corresponds (or substantially corresponds) in shape to the base perimeter 24, and at least one top member aperture 34 extends through the top member 30.

The assembly 10 also includes a tray portion 36 having a bottom wall 38 and at least one tray side wall 40 that upwardly extends from the bottom wall 38. As illustrated in FIG. 5C, the at least one tray side wall 40 extends from a first end 42 to a second end 44 along the assembly axis 20 (or, as illustrated in FIG. 5C, a tray axis 45 parallel or aligned with the assembly axis 20), and the bottom wall 38 is disposed at or adjacent to the first end 42 of the at least one tray side wall 40. Referring to FIG. 7, a bottom surface 46 of the bottom wall 38 may be in contact with or adjacent to a top surface 48 of the top member 30. Referring again to FIG. 1, the at least one tray side wall 40 defines a tray perimeter 50 when viewed along the assembly axis 20 (or the tray axis 45), and the tray perimeter 50 may correspond in shape to the base perimeter 24. As such, as illustrated in FIG. 7, an outer surface 52 of the at least one tray side wall 40 is adjacent to the inner surface 28 of the at least one side wall 14 of the base portion 12.

Referring to FIG. 5D, an inner surface 54 of the at least one tray side wall 40 and a top surface 56 of the bottom wall 38 cooperate to define a tray volume 58, wherein a cutout portion 60 extends through a portion of the bottom wall 38 of the tray portion 36. As illustrated in FIG. 6, at least a portion of the cutout portion 60 overlaps at least a portion of the top member aperture 34 to form a transmission aperture 62. In some embodiments, the cutout portion 60 is larger than the top member aperture 34 and does not obstruct the top member aperture 34, and the top member aperture 34 defines the transmission aperture 62.

The assembly 10 further includes a first sound-reducing tile 64 disposed within (or at least partially within) the tray volume 58 such that a portion of the first sound-reducing tile 64 completely covers or obstructs the transmission aperture 62. The first sound-reducing tile 64 has a first sound transmission property. As illustrated in FIG. 7, a sound generating device 65 may be (permanently or removably) disposed in a lower portion 63 of the interior volume 22 that extends between the first end 16 of the at least one side wall 14 of the base portion 12 and a bottom surface 66 of the top member 30. The sound generating device 65 may be any wireless (e.g., Bluetooth) or wired device capable of generating sound waves and/or audible noise from within the lower portion 63 of the interior volume 22. For example, the sound generating device 65 may be a speaker and receiver, or a Wireless speaker, or a smart device having a speaker.

So configured, the sound generating device 65 may be activated such that sound waves exit the transmission aperture 62 and through the first sound-reducing tile 64 such that the sound waves are mitigated, attenuated, or stopped by passing through the first sound-reducing tile 64, as will be described in more detail below. The first sound-reducing tile 64 may be replaced with a second sound-reducing tile (not shown) having a second sound transmission property that is different from the first sound transmission property. Accordingly, if the sound reducing properties of the first sound-reducing tile 64 are superior to those of the second sound-reducing tile, more sound from the sound generating device 65 will be audible when the second sound-reducing tile is used. This provides a more understandable demonstration for potential customers of the first sound-reducing tile 64 than just providing dB measurements and CAC values. Furthermore, the assembly 10 may be a mobile and easy-to-assemble during a trade show or a sales call. In addition, the insertion of first sound-reducing tile 64 into position—as well as the removal of the first sound-reducing tile 64 and insertion of the second first sound-reducing tile—is facilitated by the use of the tray portion 36. Moreover, such a tray portion functions to seal (or reduce) sound leakpaths so that the sound heard by a user is the result of sound transmission through the first sound-reducing tile 64.

Turning now to the as assembly 10 for demonstrating sound transmission properties in more detail, and with Reference to FIG. 1, the assembly 10 includes the base portion 12 includes the at least one side wall 14 that extends from the first end 16 to the second end 16 of the base portion 12. As previously explained, the at least one side wall 14 at least partially defines the interior volume 22 of the base portion 12, and the at least one side wall defines the base perimeter 24 when viewed along the assembly axis 20. The at least one side wall 14 may have any suitable shape or combination of shapes such that the base perimeter 24 is closed. For example, the base portion 12 may include a single side wall such the base perimeter 24 has a circular or oval shape. As shown in FIG. 1, the base perimeter 24 may have a square or rectangular shape such that the base portion 12 includes a first side wall 14a, a second side wall 14b, a third side wall 14c, and a fourth side wall 15d. Such an embodiment may be approximately 6"דֿ6"×6". The base portion 12 may also include the bottom wall 68 disposed at or adjacent to the first end 16 of the base portion 12, and a top surface 67 of the bottom wall 68 may at least partially define the interior volume 22. The bottom wall 68 and the one or more side walls 14 may be made from a material having low sound transmission properties (such as manufactured wood/particleboard, for example). Ideally, no sound waves originating in the lower portion 63 of the interior volume 22 could pass thorough the bottom wall 68 and the one or more side walls 14.

As illustrated in FIG. 1, 2A, and 2B, the at least one support member 26 of the assembly is to secured to the inner surface 28 of the at least one side wall 14, and the at least one support member 26 includes a support surface 70 that extends in a direction towards and/or normal (or substantially to) the assembly axis 20. The support surface 70 may have any suitable shape or configuration to support (e.g., removably support) a portion of the top member 30. For example, the support surface 70 may be planar or substantially planar, and the support surface may extend at least partially along a perimeter of circumference of the at least one side wall 14 defined by the inner surface 28. In the embodiment of FIG. 1, the support surface 70 extends around the entire perimeter of the at least one side wall 14 defined by the inner surface 28, and the support surface may be planar and may be normal to the assembly axis 20. As shown in FIG. 28, the support surface 70 is disposed a vertical first distance D1 (i.e., a distance along the assembly axis 20) from the second end 18 of the base portion 20, and the distance D1 may be approximately equal to a sum of a second distance D2 (i.e., a thickness) of the top member 30 (see FIG. 3B) and a third distance D3 (see FIG. 5C) between the first end 42 and the second end 44 of the at least one tray side wall 40 of the tray portion 36. The first distance D1 may be equal to or less than a vertical distance between the support surface 70 and the first end 16 of the base portion 12.

Referring now to FIGS. 1, 3A, and 3B, the top member 30 is at least partially supported by the at least one support member 26, and the top member 30 may be removably disposed within the interior volume 22, as illustrated in FIG. 7. Referring again to FIG. 1, the perimeter edge 32 of the top member 30 corresponds (or substantially corresponds) in shape to the base perimeter 24 of the base portion 12. For example, if the base perimeter 24 is square or rectangular, the perimeter edge 32 of the top member 30 is also square or rectangular. Portions of the perimeter edge 32 of the top member 30 that correspond to (and align with) portions of the base perimeter 24 of the base portion 12 have dimensions that are slightly less than dimensions corresponding to the portions of the base perimeter 24 of the base portion 12. The dimensions are preferably within a difference of 3% to 10% to minimize gaps between the perimeter edge 32 of the top member 30 and the base perimeter 24 of the base portion 12. Minimizing such gaps also minimizes sound leak paths when the sound generating device 65 is activated for a demonstration. The top member 30 may be planar or substantially planar, and the top surface 38 may be separated from the bottom surface 66 by the second distance D2. The at least one top member aperture 34 extends through the top member 30 from the top surface 38 to the bottom surface 66, and the top member aperture 34 may have any suitable shape. As illustrated in FIG. 3A and 3B, the top member 30 may have a single top member aperture 34 that may be circular and may have an axis 71 aligned with the assembly axis 20 when the top member 30 is disposed with the interior volume 22. In other embodiments, the top member 30 may include multiple top member apertures 34. The top member 30 may be made from a material having low sound transmission properties (such as manufactured wood/particleboard, for example). Ideally, no sound waves originating in the lower portion 63 of the interior volume 22 could pass thorough the top member 30 other than through the at least one top member aperture 34.

With reference to FIGS. 1 and 5A to 5D, the tray portion 36 of the assembly 10 includes the bottom wall 38 and at least one tray side wall 40 that upwardly extends from the bottom wall 38. As illustrated in FIG. 5C, the at least one tray side wall 40 extends from the first end 42 to the second end 44 along the tray axis 45, and the bottom wall 38 is disposed at or adjacent to the first end 42 of the at least one tray side wall 40. The at least one tray side wall 40 may extend parallel to (or substantially parallel) the tray axis 45. The one or more tray side walls 40 may have a shape that corresponds or substantially corresponds to the shape of the at least one side wall of the base portion 12. That is, the tray perimeter 50 may have a shape that corresponds or substantially corresponds to the shape of the base perimeter 24. For example, if the base perimeter 24 is square or rectangular, the tray perimeter 50 is also square or rectangular. In such an embodiment, each of the four tray walls 40a, 40b, 40c, 40d may be planar and parallel (or substantially parallel) to the tray axis 45 and the assembly axis 20. Portions of the tray perimeter 50 that correspond to (and align with) portions of the base perimeter 24 of the base portion 12 have dimensions that are slightly less than dimensions corresponding to the portions of the base perimeter 24 of the base portion 12. As such, as illustrated in FIG. 7, the outer surface 52 of the at least one tray side wall 40 is adjacent to (or in contact with) the inner surface 28 of the at least one side wall 14 of the base portion 12. The dimensions are preferably within a difference of 3% to 15% to minimize gaps between the tray perimeter 50 and the base perimeter 24 of the base portion 12. Minimizing such gaps also minimizes sound leak paths when the sound generating device 65 is activated for a demonstration.

Referring to FIG. 5C, the bottom wall 38 of the tray portion 36 extends from the first end 42 of the at least one tray side wall 40. The bottom wall may be substantially planar 38, and the bottom surface 46 of the bottom wall 38 may be in contact with or adjacent to a top surface 48 of the top member 30 in assembled form. The inner surface 54 of the at least one tray side wall 40 and the top surface 56 of the bottom wall 38 cooperate to define the tray volume 58.

Still referring to FIG. 5C, the cutout portion 60 extends through a portion of the bottom wall 38 of the tray portion 36 from the bottom surface 46 to the top surface 56. The cutout portion 60 may have any suitable shape such that at least a portion of the cutout portion 60 overlaps at least a portion of the top member aperture 34 to form a transmission aperture 62 when the tray portion 36 is coupled to the base portion 12. As illustrated in FIG. 6, the cutout portion 60 is substantially larger than the top member aperture 34 such that no portion of the cutout portion 60 obstructs a portion of the top member aperture 34 such that the transmission aperture 62 is essentially the top member aperture 34. If multiple top member apertures 34 are formed in the top member 30, multiple cutout portions 60 may be provided in the bottom wall 38 to correspond to each of the top member apertures 34 (and each of the corresponding transmission apertures 62). Alternatively, an edge defining a single cutout portion 60 may surround any or all of the collection of the top member apertures 34 to prevent obstruction of the top member apertures 34. In the embodiment of FIGS. 5A to 5B, the cutout portion 60 may have a rectangular shape and may extend across the entire bottom wall 38 from a first tray side wall 40 to a second tray side wall 40b, and the width of the cutout portion 60 may be less than a width of the bottom wall 38 but greater than or equal to a diameter of the top member apertures 34. Accordingly, sound waves originating from the sound generating device 65 within the lower portion 63 of the interior volume 22 of the base portion 12 may pass through the transmission aperture 62 unobstructed.

As illustrated in FIG. 5C, one or more lip portions 72 extends from the second end 44 of the at least one try side wall 40 in a direction normal to or substantially normal to the tray axis 45. Accordingly, an end portion of the lip portion 72 extends beyond the at least one side wall 14 of the base portion 12 when the tray portion 36 is coupled to the base portion 12. In the embodiment of the tray portion 36 illustrated in FIG. 5A to 5D, the lip portion 72 extends around the entire tray perimeter 50 collectively defined by each of the four side walls 40a, 40b, 40c, 40d. In other embodiments, the lip portion 72 may extend over only a portion of the tray perimeter 50, or tow or more lip portions 72 may each extend over only a portion of the tray perimeter 50. So configured, the lip portion 72 may partially support the tray portion 36 on the second end 18 of the base portion 12 and/or may provide a convenient gripping feature to insert and remove the tray portion 36 from the base portion 12.

In some embodiments, the top member 30 may not be used, and the cutout portion 60 may be the transmission aperture 62. In such embodiments, a portion of the bottom surface 46 of the bottom wall 38 may contact the support surface 70 of the at least one support member 26. In other embodiments the at least one support member 26 may not be present, and the one or more lip portions 72 may support the tray portion 36 on the second end 18 of the base portion 12.

Referring to FIGS. 1, 4A, and 4B, the assembly further includes the first sound-reducing tile 64 disposed within (or at least partially within) the tray volume 58 such that a portion of the first sound-reducing tile 64 completely covers or obstructs the transmission aperture 62. A perimeter edge 74 of the first sound-reducing tile 64 corresponds (or substantially corresponds) in shape to the base perimeter 24 of the base portion 12 and the tray perimeter 50 of the tray portion 36. For example, if the base perimeter 24 (and/or tray perimeter 50) is square or rectangular, the perimeter edge 74 of the first sound-reducing tile 64 is also square or rectangular. Portions of the perimeter edge 74 of the first sound-reducing tile 64 that correspond to (and align with) portions of the tray perimeter 50 of the tray portion 36 have dimensions that are slightly less than dimensions corresponding to the portions of the tray perimeter 50 of the tray portion 36. The dimensions are preferably within a difference of 3% to 10% (e.g., a maximum gap of 1/16") to minimize gaps between the perimeter edge 74 of the first sound-reducing tile 64 and the tray perimeter 50 of the tray portion 36. Minimizing such gaps minimizes sound leak paths when the sound generating device 65 is activated for a demonstration.

The first sound-reducing tile 64 may be planar or substantially planar, and a top surface 75 may be separated from a bottom surface 76 by a vertical distance that may be approximately equal to or slightly greater than the third distance D3 (see FIG. 5C) such that the top surface 75 may be disposed approximately adjacent to the second end 44 of the at least one tray side wall 40 when the first sound-reducing tile 64 is disposed within the tray volume 58. So disposed, the bottom surface 76 of the first sound-reducing tile 64 may be in contact with or immediately adjacent to the top surface 56 of the bottom wall 38 of the tray portion 36, as illustrated in FIG. 7. The first sound-reducing tile 64 may be made from a material or may have a first sound transmission property, and this first sound-reducing tile 64 may have a CAC value anywhere between 20 (for poor quality sound-reducing tiles) to 40 (for high quality sound-reducing tiles).

Any number of additional sound-reducing tiles may be used with the assembly 10. Each additional sound-reducing tile may be identical to the first sound-reducing tile 64, and the additional sound-reducing tile may be used at the same time as the first sound reducing tile 64. That is, the top surface 75 of the first sound-reducing tile 64 may be adjacent to or in contact with a bottom surface 76 of an additional first sound-reducing tile 64 such that two sound reducing tiles are stacked and disposed within (or at least partially within) the tray volume 58.

In addition, additional sound-reducing tiles (e.g., a second sound-reducing tile, a third sound-reducing tile, etc.) may be used with the assembly 10 that may be identical to the first sound-reducing tile 64 with the exception of the material and/or the sound transmission property. That is, the second sound-reducing tile (or a third or subsequent sound-reducing tile) may have a second (or third, etc.) sound transmission property that is different than the first sound transmission property. Such a second sound-reducing tile (or a third or subsequent sound-reducing tile) would not be used at the same time as the first sound-reducing tile 64, but would be inserted in the tray volume 58 after the first sound-reducing tile 64 is removed. Any number of identical second sound-reducing tiles (or a third or subsequent sound-reducing tile) may be stacked and used at the same time, as described in the previous paragraph. Preferably, during a demonstration, the number of second sound-reducing tiles (or third or subsequent sound-reducing tiles) used simultaneously would be equal to the number of first sound-reducing tiles 64 used simultaneously.

To use in a demonstration of the sound transmission property (properties) of the first sound-reducing tile 64, the user may first assemble the base portion 12, if assembly is required. In some embodiments, the base portion 12 is collapsible or foldable to allow for convenient storage. As illustrated in FIG. 7, the sound generating device 65 may then be placed in the lower portion 63 of the interior volume 22 of the base member 12, and the top member 30 may be placed on the one or more support members 26. The first sound-reducing tile 64 (and any additional first sound-reducing tiles 64) may then be placed in the tray volume 58 of the tray portion 36, and the tray portion 36 may be inserted into the top of the base portion such that the bottom surface 46 of the bottom wall 38 of the tray portion 36 rests on or is adjacent to the top surface 48 of the top member 30. In alternative embodiments, the tray portion 36 may be inserted into the base portion 12 and the first sound-reducing tile 64 may then be placed in the tray volume 58 of the tray portion 36.

To conduct the demonstration, the sound generating device 65 may be activated and may emit a sound from within the lower portion 63 of the interior volume 22 of the base portion 13. Because of the minimized sound leak paths and sound transmission properties of the base member 12, the top member 30, and/or the tray portion 36, sound waves from the sound generating device 65 only exit (or predominantly exit) the lower portion 63 of the interior volume 22 though the transmission aperture 62. Accordingly, the sound waves must travel through the first sound-reducing tile 64 (and any additional and identical first sound-reducing tiles 64), and any sound of the sound generating device 65 audible outside of the lower portion 63 of the interior volume 22 has passed through—and been attenuated by—the first sound-reducing tile(s) 64. A first sound level may be measured and/or recorded at a first position exterior to the assembly 10 (e.g., exterior to the lower portion 63 of the interior volume 22). The first sound level may be measured and/or recorded by a decibel meter 78 or the equivalent, for example.

To test a second sound-reducing tile (which may be a competitor's tile), the first sound-reducing tile 64 is removed from the tray portion 36 and base portion 12, and the second sound-reducing tile is inserted into the tray portion 36 and base portion 12 as described above. As previously explained, any number of identical second sound-reducing tiles may be used simultaneously. After the sound generating device 65 is activated, a second sound level may be measured and/or recorded at the first position exterior to the assembly 10 (e.g., exterior to the lower portion 63 of the interior volume 22). Typically, the first sound-reducing tile 64 has a higher CAC value than the second sound reducing tile so that less sound is transmitted through the first sound-reducing tile 64 than the second sound-reducing tile.

To ensure accurate results, the first position should be the same during measurements of the first sound-reducing tile 64 and the second sound-reducing tile. The first sound level can then be compared to the second sound level to demonstrate the effectiveness of the first sound transmission properties of the first sound-reducing tile 64 over the second sound transmission properties of the second sound-reducing tile 64.

While various embodiments have been described above, this disclosure is not intended to be limited thereto. Variations can be made to the disclosed embodiments that are still within the scope of the appended claims.

What is claimed is:

1. A method of using a sound-reducing tile demonstration device, the method comprising:
    placing a first sound-reducing tile in a first portion of an assembly, the first sound-reducing tile having a first sound transmission property;
    activating a sound emitting device disposed within an interior volume defined by the assembly such that sound exiting the interior volume passes through the first sound-reducing tile;
    measuring a first sound level at a first position exterior to the assembly and the demonstration device;
    placing a second sound-reducing tile in the first portion of the assembly, the second sound-reducing tile having a second sound transmission property that is different than the first sound transmission property;
    activating the sound emitting device disposed within the interior volume defined by the assembly such that sound exiting the interior volume passes through the second sound-reducing tile; and
    measuring a second sound level at the first position exterior to the assembly.

2. The method of claim 1, further comprising:
    comparing the second sound level to the first sound level.

3. The method of claim 1, wherein placing the first sound-reducing tile in the first portion of the assembly includes placing the first sound-reducing tile in a tray portion and inserting the tray portion and the first sound-reducing tile in a base portion, and
    wherein placing the second sound-reducing tile in the first portion of the assembly includes placing the second sound-reducing tile in the tray portion and inserting the tray portion and the second sound-reducing tile in the base portion.

4. The method of claim 3, wherein placing the first sound-reducing tile in a tray portion and inserting the tray portion and the first sound-reducing tile in a base portion includes grasping a lip portion of the tray portion to insert the tray portion and the first sound-reducing tile in the base portion, and wherein placing the second sound-reducing tile in the first portion of the assembly includes grasping the lip portion of the tray portion to insert the tray portion and the second sound-reducing tile in the base portion.

5. A method of using a sound-reducing tile demonstration device, the method comprising:

placing a first sound-reducing tile in a tray portion of an assembly and inserting the tray portion and the first sound-reducing tile in a base portion of the assembly, the first sound-reducing tile having a first sound transmission property;

activating a sound emitting device disposed within an interior volume defined by the assembly such that sound exiting the interior volume passes through the first sound-reducing tile;

measuring a first sound level at a first position exterior to the assembly;

placing a second sound-reducing tile in the tray portion of the assembly and inserting the tray portion and the second sound-reducing tile in the base portion of the assembly, the second sound-reducing tile having a second sound transmission property that is different than the first sound transmission property;

activating the sound emitting device disposed within the interior volume defined by the assembly such that sound exiting the interior volume passes through the second sound-reducing tile; and measuring a second sound level at the first position exterior to the assembly.

\* \* \* \* \*